INVENTOR.
ROBERT H. GEORGE
BY
ATTORNEY

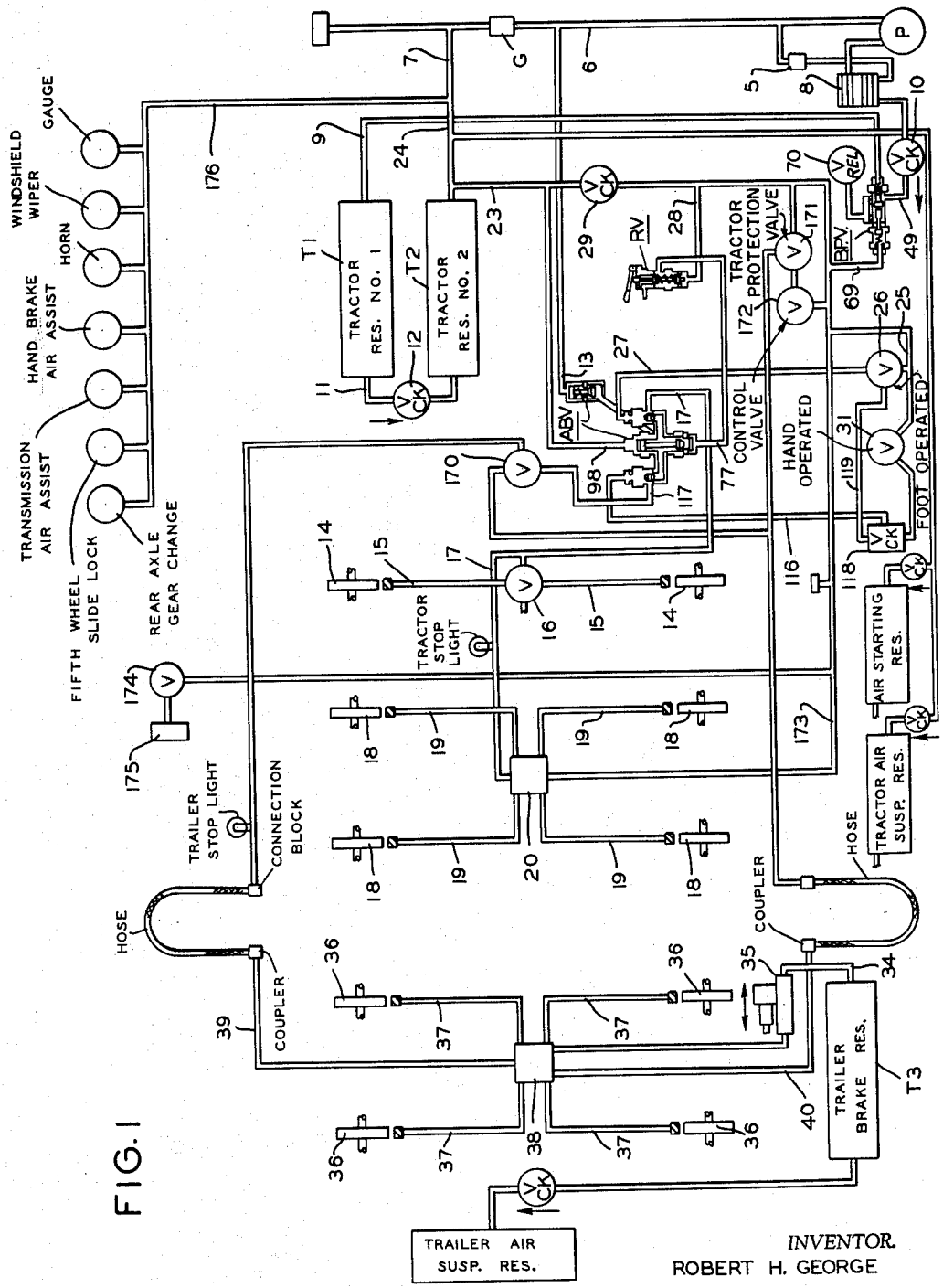

Oct. 8, 1963  R. H. GEORGE  3,106,430
AUTOMATIC AIR BRAKE SYSTEM INCLUDING CIRCUIT INTEGRITY TESTING
Filed Aug. 30, 1960  3 Sheets-Sheet 3
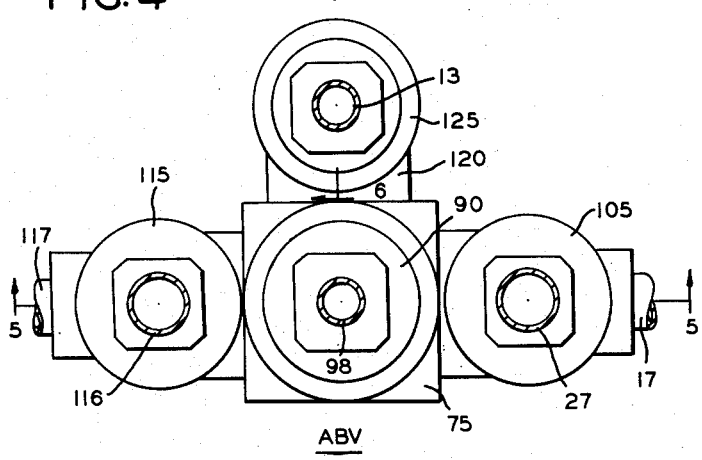
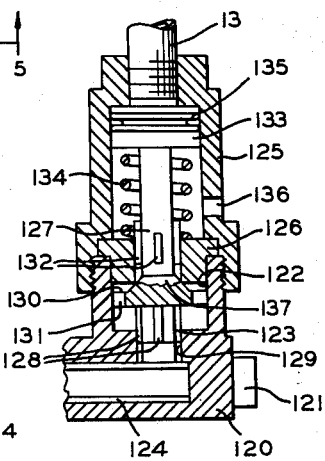
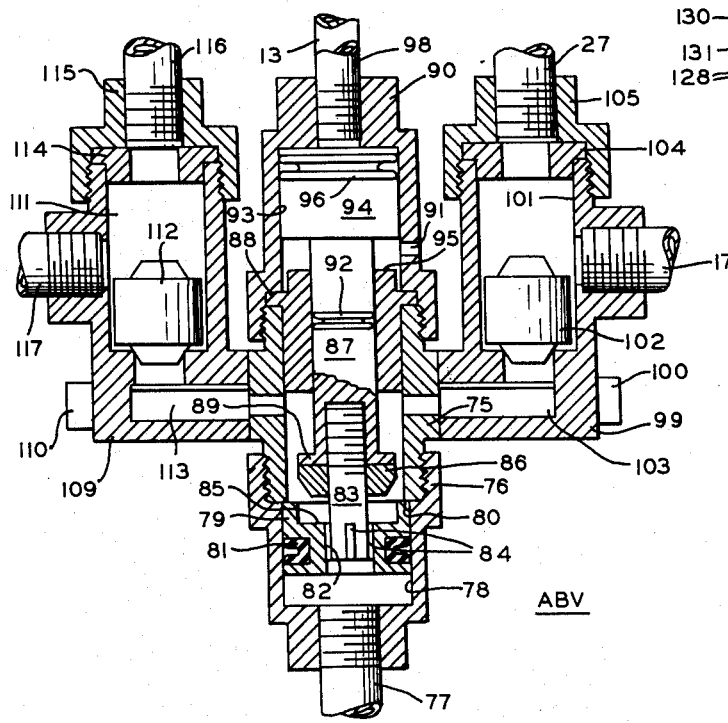
INVENTOR.
ROBERT H. GEORGE
ATTORNEY

United States Patent Office 3,106,430
Patented Oct. 8, 1963

---

3,106,430
AUTOMATIC AIR BRAKE SYSTEM INCLUDING CIRCUIT INTEGRITY TESTING
Robert H. George, Melrose Park, Pa., assignor to Brakemaster Corporation, Philadelphia, Pa., a corporation of Pennsylvania
Filed Aug. 30, 1960, Ser. No. 52,971
6 Claims. (Cl. 303—1)

This invention relates to air brake systems for automotive vehicles and more particularly to air brake systems for use on heavy vehicles such as trucks, tractors, tractor trailers, busses and automotive construction equipment.

Accidents involving heavy automotive vehicles have been attributed to many different causes. Jack-knifing of trailers due to high pressure brake applications caused by the operation of the emergency relay valve on curves, wet or icy roads; leakage of the brake system, and loss of air pressure from faulty operation, have been particular causes for concern.

In some instances insufficient attention to maintenance of components of the brake system has resulted in operation of the vehicle when the condition of the brake system is faulty.

In the operation of automotive vehicles, also, when a compressor in a heavy vehicle air brake system is idling, such as occurs when drifting on a down grade, the supply of air needed for proper braking is not ordinarily sufficiently maintained.

When a truck or tractor provided with an air brake system has been standing for a period of time it frequently happens that, due to leaks in the system, sufficient pressure is not immediately available for braking purposes.

In the operation of heavy vehicles also, it is a common practice for the operators, particularly on down grades, to make a succession of light brake applications, these being frequently referred to as "fanning." The effect of this practice is to reduce the available air pressure in the reservoir air tanks to a point where there is insufficient air under pressure to operate the brakes and thereby properly control the movement of the vehicle.

It is the principal object of the present invention to provide an airbrake system for motor vehicles which has contained within the system restrictive controls which will permit of initially pressure testing the brake system components before the system is operated or capable of normal operation.

It is a further object of the present invention to provide an air brake system for automotive vehicles in which a predetermined cycle is imposed which includes supplying air to set the tractor brakes, then supplying air to the trailer to set the trailer brakes, then charging the trailer air tank at a predetermined test pressure level, then supplying air to charge the tractor tank, and then, at a different predetermined pressure level and preferably that at which the governor is set, releasing the brakes.

It is a further object of the present invention to provide an air brake system in which, when the pressure at a selected location falls below a predetermined level, the brakes will be applied and a control element is provided so that the brakes can be released by the operator for operation of the vehicle in a restricted manner.

It is a further object of the present invention to provide an air brake system having provisions for applying a predetermined test pressure at a level greater than normal operating pressure for ascertaining the condition of components of the system including piping, hoses, diaphragms, and couplings.

It is a further object of the present invention to provide an air brake system which will reduce the likelihood of accidents attendant upon human failures in the operation and maintenance of air brake systems for automotive vehicles.

It is a further object of the present invention to provide an air brake system which contains within the system controls which will prevent initial movement of the vehicle unless there is sufficient air pressure in a predetermined part of the brake system for proper brake operation.

It is a further object of the present invention to provide an air brake system for automotive vehicles in which the brakes on all the wheels, both of the tractor and trailer, are automatically applied whenever the tractor reservoir pressure falls below a predetermined value.

It is a further object of the present invention to provide an air brake system for automotive vehicles having control structure built thereinto by which it can be ascertained that the brake system has been properly repaired after a road air failure.

It is a further object of the present invention to provide an air brake system by which the operator can quickly and easily ascertain whether there has been adequate brake maintenance prior to use of the vehicle on the road.

Other objects and advantageous features of the invention will be apparent from the description and claims.

The nature and characteristic features of the invention will be more readily understood from the following description, taken in connection with the accompanying drawings forming part thereof, in which:

FIGURE 1 is a diagrammatic view of an air brake system for automotive vehicles of the tractor trailer type, embodying the main features of the present invention;

FIG. 4 is a top plan view of an automatic brake control valve employed with the system shown in FIG. 1;

FIG. 5 is a vertical sectional view taken approximately on the line 5—5 of FIG. 4; and FIG. 6 is a fragmentary sectional view taken approximately on the line 6—6 of FIG. 4.

Figure 3:
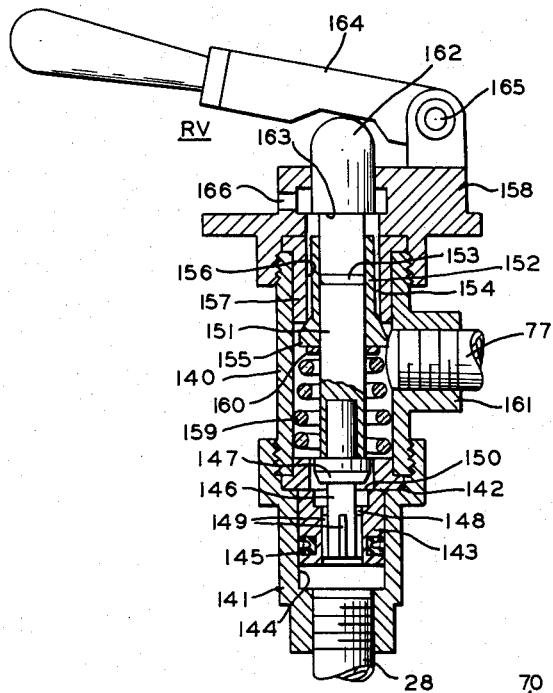
FIG. 3 is a vertical central sectional view of a self-restoring manually operable brake release valve employed with the system of the present invention.

It should, of course, be understood that the description and drawings herein are illustrative merely, and that various modifications and changes can be made in the structure disclosed without departing from the spirit of the invention.

Like numerals refer to like parts throughout the several views.

Referring to the drawings, in the particular embodiment of the invention therein shown, the general arrangement of the brake system of the present invention is in many respects similar to that commonly used in heavy automotive vehicles and particularly those in which detachable trailers are employed in connection with tractors, the trailer braking system being coupled to the tractor braking system when the tractor and trailer are used together. With the exception of certain special valves which are employed and are hereinafter more fully described, numerous other parts may be the same as or are similar to those at present in common use in heavy vehicle braking systems.

Referring now more particularly to FIG. 1 of the drawings, there is provided an air compressor or pump P with an aftercooler 8 and a pair of tractor reservoir tanks T1 and T2 for receiving the air delivered through the aftercooler 8 from the compressor or pump P to an automatic by-pass valve BPV through a check valve 10. The valve BPV is connected by a pipe line 9 to the reservoir tank T1 which is connected to the reservoir tank T2 by a pipe 11, a non-return or check valve 12 being interposed therebetween.

A governor G connected to the tank T2 by a pipe 7 is responsive to the pressure in the tank T2 and has a pipe line 13 connected thereto, and an operating line 6 to the pump and to a moisture ejector 5.

The tractor front wheels (not shown) are provided with right hand and left hand air operated brakes 14, connected by pipe lines 15 to a quick release valve 16 of well known type, and with tractor service pipe line 17 leading to the valve 16.

The tractor rear wheels (not shown) can also be provided with right hand and left hand front and rear air operated brakes 18 connected by pipe lines 19 to a relay valve 20 of well known type, and with the tractor service pipe line 17 connected thereto. The pipe line 17 is connected to an automatic brake valve ABV shown in detail in FIGS. 4, 5 and 6, and hereinafter more fully described.

The automatic brake valve ABV has the ordinary foot operated brake control valve 26 connected thereto by a pipe line 27. The foot operated brake control valve 26 is connected by a supply pipe line 25 to a supply pipe 28 extending to the tank T2, and a non-return or check valve 29 is interposed in the line 28.

A hand operated control valve 31, connected to the supply line 28, can also be provided on the tractor to permit of the operation of the trailer brakes independently of the tractor brakes. The valve 31 is also connected to the automatic brake valve ABV and therethrough to the trailer brakes 36 as hereinafter explained.

A brake release valve RV, shown in detail in FIG. 3, and hereinafter more fully described, for releasing the automatic brake valve ABV, can be provided between the pipe line 28 and the automatic brake valve ABV although for some types of installation, and where no overriding of the automatic brake application is to be permitted will not be utilized.

The trailer, which is adapted to be coupled to the tractor or uncoupled therefrom as desired, is ordinarily provided with a reservoir tank T3. Right and left hand air operated trailer brakes 36 are connected by pipes 37 to an emergency relay valve 38 of known type to which the tank T3 is connected by a pipe 34 which may have a pressure regulator and check valve 35 therein to cause the trailer brakes to be applied up to the regulator setting before starting to charge the tank T3. Such a pressure regulator and check valve is shown in detail in FIG. 3 of my prior Patent No. 2,930,658 and in FIG. 4 of my prior Patent No. 2,938,753.

The relay 38 has the brake service line 39 and the emergency feed line 40 connected thereto.

In air brake systems for heavy vehicles as heretofor provided, it was customary to connect the air compressor directly to the main reservoir tanks but in my prior U.S. Patent No. 2,938,753, provisions are made for bypassing the air from the compressor directly to the brakes under certain predetermined conditions.

As shown in FIG. 1 of the drawings the automatic bypass valve BPV is provided for bypassing the air from the compressor P directly to the brakes under certain conditions at the commencement of building up of pressure, and subsequently if the pressure in the reservoir tanks T1 and T2 falls below a predetermined value.

Figure 2:
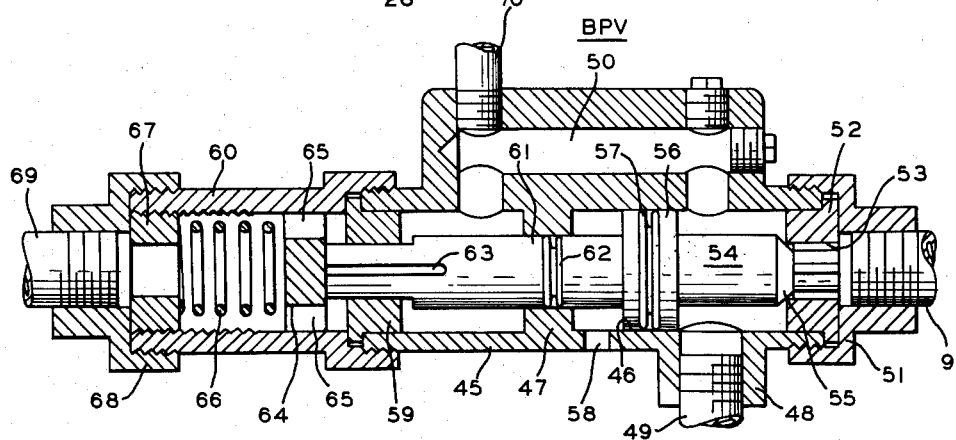
FIG. 2 is a vertical central sectional view of a bypass valve employed with the system of the present invention.

The automatic bypass valve BPV for this purpose is shown in detail in FIG. 2 of the drawings. The valve BPV comprises a main housing 45 having an internal cylindrical bore 46 with a central partition wall 47 in the interior of the housing 45. The bore 46 has a fluid connection 48 to which a pipe line 49 extending from the aftercooler 8, is connected. The pipe line 49 has the check valve 10 therein.

The housing 45 has a passageway 50 connecting parts of the bore 46 on opposite sides of the partition 47. Near one end of the housing 45, a cap 51 is provided for connecting the pipe line 9 to the reservoir or tank T1. The cap 51 retains a guiding and seat bushing 52 in position. The bushing 52 has a central opening 53 therethrough the inner end of which provides a valve seat for a valve plug 54 guided in the opening 53. The valve plug 54 has a seating portion 55 and has a head 56 slidable in the bore 46 and which is provided with a packing ring 57 for preventing fluid leakage. A vent 58 to the atmosphere is provided in the wall of the housing 45.

The housing 45 is also provided at the opposite end with a guiding ring 59 held in position by one end of a spring cylinder 60 in threaded engagement therewith.

The valve plug 54 engages a stem 61 extending through the partition wall 47 and provided with a packing ring 62 for preventing fluid leakage longitudinally of the opening in the partition wall 47. The stem 61 is guided in the guiding ring 59 and has a plurality of longitudinally extending grooves 63 for permitting fluid flow between opposite sides of the ring 59.

The stem 61 is engaged by a head 64 slidable within the spring cylinder 60 and which has a plurality of longitudinal grooves 65 therealong for permitting fluid flow.

The head 64 has in engagement with one face thereof, a helical coil spring 66 which urges the stem 61 against the valve plug 54 to urge seating portion 55 towards seated position. The spring 66, at the other end thereof, has a ring 67 in engagement therewith. The ring 67 is in threaded engagement in the spring cylinder 60 for adjustable positioning to apply the desired force on the spring 66 by its positioning within the spring cylinder 60. The ring 67 is prevented from dislodgment by an end cap 68 which is in threaded engagement with the spring cylinder 60. The cap 68 is connected by a fluid connection 69 extending to the connection of the pipe 25 and the pipe 28, and accordingly directly to the brake system.

It will be noted that the valve plug 54, in the absence of sufficient pressure in the system and acting against the head 56 will be impelled by the coil spring 66 to cause the valve seating portion 55 to be seated on the bushing 52. Accordingly, as the seating portion 55 is opened only by the building up of pressure in the brake system and of sufficient pressure to overcome the force of the spring 66, air will always be available for delivery into the brake system from the pipe 49 through the passageway 50, the grooves 63, the longitudinal grooves 65 and the fluid connection 69.

When the valve seating portion 55 is opened by the application of sufficient pressure on the head 56, air can flow into the reservoir T1 through the pipe 9 from the aftercooler 8 for charging, and from the reservoir T1 as well as through the passageway 50 and the pipe 69.

The valve housing 45 can have a pressure relief valve 70 connected thereto and in communication with the passageway 50, the pressure relief valve 70 opening upon the attainment of an excessive pressure to prevent damage.

The automatic brake valve ABV, shown in more detail in FIGS. 4, 5 and 6, but turned from the position shown in FIG. 1 for purposes of illustration, includes a central valve body 75 having a connection cap 76 in threaded engagement with the lower end thereof.

The cap 76 has an inlet connection 77 from the release valve RV and has a bore 78 for sliding movement therein of a piston 79, the piston 79 being limited in its upward movement by an abutting end face 80 provided on the valve body 75.

The piston 79 is provided with a packing 81 for preventing fluid leakage and has an interior bore 82 within which a valve seating plug extension 83 is slidably mounted. The extension 83 has a plurality of ribs 84 thereon to permit fluid flow through the bore 82. The piston 79 has an upper interior portion 85 for providing a seat for the valve plug 86 upon downward movement thereof.

The extension 83 is in threaded engagement with a stem 87 which is guided in a sleeve 88, the sleeve 88 being held in position with respect to the valve body 75 by a cylinder cap 90 which is in threaded engagement with the valve body 75. The stem 87 has an end enlargement 89 for engagement with the valve plug 86.

The cylinder cap 90 has a vent 91 to atmosphere in the wall thereof for relief of brake applying pressure as hereinafter explained.

The valve stem 87 is provided with a packing 92 for preventing fluid leakage along the interior of the sleeve 88.

The cylinder cap 90 has a bore 93 for the reception of a piston 94 which can be separate from the valve stem 87 and is limited in its downward movement by an end shoulder 95 on the sleeve 88. The piston 94 is provided with a packing 96 for preventing fluid leakage along the piston 94. A fluid connection 98 is provided through the cylinder cap 90 and connected to a pipe 23 which is connected by a pipe 24 to the reservoir T2 for applying fluid pressure from the reservoir T2 against the piston 94 as hereinafter explained.

The central valve body 75 has a side body portion 99 on one side thereof held in position by cap screws 100. The side body portion 99 has a cylinder bore 101 within which the spindle 102 of a double acting check valve is mounted and adapted to be seated in a lower position to shut off communication between the lower end of the cylinder bore 101 and a passageway 103 communicating with the interior of the valve body 75 below the sleeve 88. The spindle 102 can also be seated in an upper position to shut off communication between the upper end of the cylinder bore 101 in which a seating bushing 104 is retained by a cap 105 to which the pipe 27 from the foot brake valve 26 extends and the tractor service pipe 17 which is connected to the cylinder bore 101.

The central valve body 75 has a side body portion 109 on another side thereof held in position by cap screws 110. The side body portion 109 has a cylinder bore 111 within which the spindle 12 of a double acting check valve is mounted and adapted to be seated in a lower position to shut off communication between the lower end of the cylinder bore 111 and a passageway 113 communicating with the interior of the valve body 75 below the sleeve 88. The spindle 112 can also be seated in an upper position to shut off communication between the upper end of the cylinder bore 111 in which a seating bushing 114 is retained by a cap 115 to which a pipe 116 from the hand brake control valve 31 extends and the trailer service pipe 117 which is connected to the cylinder bore 111.

While both check valves with their spindles 102 and 112 are required for tractor trailers, a single vehicle such as a truck or bus would require only a single double acting check valve at this location.

A double acting check valve 118 is provided in the line 116 and a pipe 119 from the foot operated brake control valve 26 can also be connected to the valve 118.

The contral valve body 75 has another side body portion 120 on another side thereof held in position by cap screws 121. The side body portion 120 has a valve bore 122 therein with an opening 123 at the lower end thereof communicating through a passageway 124 with the interior of the valve body 75 below the sleeve 88.

The body portion 120 has, at the upper end thereof, a cylinder cap 125 in threaded engagement therewith. The cylinder cap 125 retains a guide and seat bushing 126 in position for guiding a valve spindle 127. The valve spindle 127 has guiding ribs 128 in slidable engagement with a bore 129 in the lower part of the body portion 120, a guiding rim 130 provided with a plurality of notches 131 for fluid flow, a seating portion 137 to seat on the bushing 126 and a plurality of ribs 132 for guiding the spindle 127 in the bushing 126.

A piston 133 is slidably mounted in the cylinder cap 125 and is normally urged from engagement with the spindle 127 by a spring 134 of predetermined spring rate which engages the piston 133 at one end and is in engagement at the other end with the bushing 126. The piston 133 has a packing 135 for preventing fluid leakage past the piston 133.

A vent 136 is provided from the interior of the cylinder cap 125 below the lowermost position of the piston 133 and in communication with the atmosphere. The cylinder cap 125 has the fluid connection 13 to the governor G connected thereto for applying pressure against the upper end of the piston 133 delivered through the governor G when a predetermined pressure is applied at the governor G.

The manually operable automatic brake valve release valve RV, shown in detail in FIG. 3, includes a valve body 140 having an inlet connection cap 141 in threaded engagement therewith to which the pipe 28 extends.

The cap 141 retains an interposed spring abutment and stop bushing 142 in place, the bushing 142 providing an upper limit stop for a piston 143 within a bore 144 in the cap 141.

The piston 143 is provided with a packing 145 for preventing fluid leakage therealong and has a stem 146 of a valve seating plug 147 guided in a bore 148 in the piston 143 by a plurality of spaced ribs 149 on the stem 146. The valve plug 147 is adapted for engagement with a seat 150 formed in the piston 143. The valve stem 146 is connected to a valve spindle 151 which is slidably mounted within a ferrule 152.

The spindle 151 is provided with a groove for the reception of a packing ring 153 which engages the interior surface of the ferrule 152, the ferrule 152 having a plurality of external grooves therealong between ribs 154 and terminating at a seating head 155.

The ferrule 152 is slidable within a bore 156 formed within a seat ring 157, the seat ring 157 being held by a cap 158 in threaded engagement with the body 140. A spring 159 in engagement at one end with the bushing 142 and at the other end with a washer 160 which engages the ferrule head 155 normally urges the ferrule head 155 to a seated position with respect to the seat ring 157.

The valve body 140 is provided with an outlet connection 161 from which the pipe 77 extends to the automatic brake valve ABV.

The valve spindle 151 has an enlarged head 162 with a lower rim 163 adapted to engage the ferrule 152 upon downward movement of the spindle 151 to move the ferrule head 155 from its seat on the ring 157 and has a lever 164 for manual operation pivotally connected to the cap 158 by a pivot pin 165. A vent 166 to atmosphere is provided in the cap 158.

The manually operable automatic brake valve release valve RV and its operating lever 164 are preferably placed at an accessible but not too convenient location, so that a conscious effort is required for operation of the lever 164, as hereinafter explained.

A service line breakaway or tractor protection valve 170 can be provided in the service line 39 with a connection to the automatic brake valve ABV and an emergency line breakaway or tractor protection valve 171 can be provided in the emergency feed line 40, with a control valve 172 therefor connected to a pipe 173 from the pipe 28 to the relay valve 20.

The valves 170 and 171 are adapted to open at predetermined pressure levels, say 60 and 65 p.s.i. to supply air under pressure to the service line 40 and to the relay valve 38 for brake application.

The pipe 173 can, if desired, have the conventional retarder control valve 174 and retarder 175 connected thereto.

Other conventional equipment employed in connection with tractor trailers can be employed including air operated auxiliaries connected to the reservoir T2 by a pipe 176.

The mode of operation will now be pointed out.

Assume that there is no pressure in the system, either because of a leak or leaks that have been repaired or for some other reason.

The automatic bypass valve BPV will have the valve seating portion 55 thereof in engagement with the bushing 52 and closed since there will not be any or sufficient pressure effective against the piston 56 to overcome the valve closing force effected by the spring 66.

Upon operation of the pump or compressor P air from the compressor or pump P will be supplied through the aftercooler 8 and the check valve 10 to the automatic bypass valve BPV and through the passageway 50, past the piston 64 and through the pipe 69 to the pipe 28.

From the pipe 28, fluid under pressure will be supplied through the fluid connection 173 and to the relay valve 20 to condition the relay 20 for brake application. From the pipe 38 fluid under pressure will be supplied through the valve RV, the pipe 77, the valve ABV and to and through the pipe 17 to activate the relay valve 20 to apply the brakes 18. Fluid will also be effective through the pipe 17 to the quick release valve 16 and therefrom through the pipes 15 for applying the brakes 14.

The check valve 29 prevents flow therebeyond to the pipe 23, the closed condition of the foot operated brake control valve 26 prevents flow therebeyond, and the closed condition of the hand operated brake control valve 31 prevents flow therebeyond.

The supply of pressure fluid to the relay 20 continues until a first predetermined pressure level is reached, say of the order of 60 p.s.i.

At a predetermined higher pressure level, say of the order of 65 p.s.i., the emergency line breakaway valve 171 opens and air under pressure is supplied to and through the trailer emergency service line 40 to the emergency relay valve 38 and therefrom through the pipes 37 to set the trailer brakes 36.

The pressure effective through the breakaway valve 171 is also then effective for controlling the service line breakaway valve 170 so that air can pass therethrough to the trailer service line 39.

The brakes 18 and 14 of the tractor and the brakes 36 of the trailer remain held in set condition. The pressure continues to increase and continues to be applied against the tractor brakes 14 and 18 and the trailer brakes 36. The trailer brake reservior T3 is charged with air under pressure.

The pressure is increased up to a desired test pressure level, assumed for purposes of description as 140 p.s.i. This test pressure is applied for pressure testing the diaphragms of the brakes 36, of the brakes 18 and of the brakes 14, and for pressure testing the pipes 39 and 40 and the hose connections therein and other devices, including auxiliaries, connected thereto.

As the pressure level is rising, but before the test pressure level has been attained, air under pressure is effective from the pipe 28 through the release valve RV in non-venting position, and the pipe 77 to the automatic brake valve ABV from which it passes the valve plug 86 and moves through the passageways 103 and 113 for delivery to the tractor service line 17 and through the pipe 117 to the tractor service line 39. The valve plugs 102 and 112 will permit this flow and also prevent back flow to the pipes 27 and 116. The valve plug 130 closes as soon as pumping commences and prevents discharge through the vent 136.

When the pressure at the bypass valve BPV and effective on the piston 56 reaches a predetermined level, as determined by the spring rate of the spring 66 and the position of adjustment of the ring 67, the pressure effective on the piston 56 moves the valve plug 54 to open position so that fluid is delivered through the pipe 9 to charge the reservoirs T1 and T2 with air under pressure. The pressure level at which the bypass valve BPV opens is the test pressure previously referred to and assumed at 140 p.s.i.

Air is thus supplied to the reservoirs T1 and T2 and when the presure in the reservoir T2 reaches a predetermined level and preferably a level below the test pressure level, and which may be of the order of 120 p.s.i., this pressure is effective through the pipe 24 and at the governor G. This pressure may be referred to as a governor actuating pressure level. When the governor actuating pressure level is effective at the governor G, the governor G is opened and this is effective in a well known manner for stopping further delivery from the pump P while at the same time air is delivered through the pipe 13 to the automatic brake valve ABV and against the piston 135 to move the same downwardly against the force of the spring 134 and the upward fluid pressure effective thereon to force the valve seating portion 137 to open position with respect to its seat on the ring 126. A connection to the atmosphere is thus provided through the vent 136. Air under pressure from the passageway 124, the interior of the body 75 and the passageways connected thereto is effective for venting the tractor service line 17 and the trailer service line 39 connected to the valve 26 by the line 117 through the breakway valve 170. The venting of the pressure in these lines effects a release of the brakes of both the tractor and the trailer.

The system is now in condition for normal operation.

The foot operated brake control valve 26 may be manipulated in the usual manner for supplying air from the pipe 25 through the pipe 27 and through the valve ABV and pipe 17 to the relay 20 for operating the tractor brakes 14 and 18 and through the pipe 119, the double acting check valve 118, the pipe 116 to the valve ABV and through the pipe 117 and the valve 170 to the pipe 39 for operating the trailer brakes 36. The valve 26 can also exhaust air under pressure from the pipe 27 and the parts connected thereto for normal brake release.

The hand operated brake control valve 31 may be manipulated in the usual manner for supplying air from the pipe 25 through the double acting check valve 118, the pipe 116, the valve ABV, the pipe 117, and the valve 170 to the service line 39.

The valve 31 can also exhaust air under pressure for normal brake release.

If during operation, the tractor reservoir pressure available in the tank T2 should drop to a predetermined level, say of the order of 60 p.s.i., this decrease in pressure is effective on the piston 94 of the valve ABV so that the valve plug 86 moves from its seat at 85. The valve 130 also closes so that pressure is applied through the pipe 117 and the service line 39 to apply the trailer brakes 36. At the same time air under pressure is applied through the tractor service line 17 to apply the tractor brakes 14 and 18. It will be noted that this application of the brakes is automatically effected, independent of the volition of the operator.

Since the automatic brake application just described may occur at some undesired location, the automatic brake valve release valve RV is provided so that by manual manipulation of the lever 164, and only as long as the lever 164 is held down, air under pressure is exhausted therethrough from the pipe 77 and the automatic brake valve ABV to temporarily overcome the effect of the action of that valve in supplying air for brake application. Movement of the vehicle can thus be effected in a restricted fashion so that the vehicle can be moved to a location for checking and repair.

Upon starting up again, the sequence previously described will be effective.

The automatic brake control valve ABV is also effective with the valve 171 to prevent a high pressure trailer brake application during the changeover from normal air supply to emergency air supply.

If the valve 171 was effective to open at a predetermined pressure, assumed at approximately 65 p.s.i., to vent the pipe 40, such a high pressure brake application could occur but in the operation of the present system the pressure on the piston 96 is released at approximately 60 p.s.i., opening the valve 86 to effect automatic brake application. The valve 55 in the bypass valve BPV closes at the same time thus delivering emergency air pressure to the pipe 28 to be effective against all the brakes.

It should be noted that under normal operating conditions, when the system is fully charged, and when a brake application is made by either the valve 26 or by the valve 31, air will flow from two sources, i.e., from the reservoir T2 through the check valve 29 to the pipe 28 and also through the passageway 50 into the pipe 69 and to the pipe 28. By the use of these two sources of supply, it has been determined that the number of brake applications that can be made before the pressure in the reservoir T2 is depleted to the level to operate the valve ABV is greatly increased.

At any time the pressure in the system and effective on the psiton 56 falls to say 60 p.s.i., the bypass valve BPV closes for direct supply of air for automatic brake application.

I claim:

1. In an air brake system for automotive vehicles including
   (a) an air compressor,
   (b) an air reservoir tank for the vehicle,
   (c) a governor for said compressor responsive to the pressure in said tank for delivery of air at an upper control level limit pressure,
   (d) piping extending from said compressor to said tank,
   (e) air operated brakes on the vehicle,
   (f) relay valve means for operating said brakes,
   (g) piping extending from said tank to said relay valve means,
   (h) and manually operable valve means for controlling the flow of air through the piping from said tank to said relay valve means for the ordinary operation thereof, the combination therewith of
   (i) structure for applying a test pressure at a predetermined test pressure level on said brakes and the piping extending thereto, said structure including,
   (j) means for automatically causing the air to pass directly from the compressor to the relay valve means,
   (k) said means including an automatic pressure responsive valve interposed in the piping between said compressor and said tank and shutting off communication therethrough until said test pressure level is attained,
   (l) said automatic pressure responsive valve having a bypass fluid connection to said relay valve means
   (m) and a brake control valve connected between said piping extending from said compressor to said relay valve means and to said relay valve means for controlling said relay valve means,
   (n) said brake control valve including means responsive to pressure of air delivered from said compressor for opening said connection between said piping extending from said compressor to said relay valve means and said relay valve means, and including a second valve means responsive to pressure of air delivered from said governor at said upper control level limit for discharging the controlling pressure from said relay valve means and responsive to a lower control pressure from said governor for preventing said discharging.

2. An air brake system as defined in claim 1 and further including a manually operable valve for releasing the air pressure applied to said relay valve means by said brake control valve for controlling said brakes for restricted operation.

3. In an air brake system for automotive vehicles of the tractor trailer type, including,
   (a) an air compressor,
   (b) an air reservoir tank for the tractor,
   (c) a governor for said compressor responsive to the pressure in said tractor tank for delivery of air at a normal system operating pressure upper level limit,
   (d) piping extending from said compressor to said tractor tank,
   (e) air operated brakes on the tractor,
   (f) tractor relay valve means connected to said tractor brakes,
   (g) an air reservoir tank for the trailer,
   (h) air operated brakes on the trailer,
   (i) trailer relay valve means connected to the trailer brakes,
   (j) piping extending from said tractor tank to said tractor and trailer relay valve means, including a fluid connection to said relay valve means, and
   (k) manually operable valve means for controlling the flow of air through the piping from said tank to said tractor and trailer relay valve means for the ordinary operation thereof, the combination therewith of
   (l) structure for applying a test pressure at a level above the normal system operating pressure level limit on said tractor and trailer relay valve means and said brakes and the piping extending thereto,
   (m) said structure including means for automatically causing the air to pass directly from the compressor to the tractor and trailer relay valve means and said brakes,
   (n) said means including an automatic pressure responsive valve interposed in the piping between said compressor and said tractor tank and having a portion for shutting off communication therethrough until said predetermined test pressure upper level limit is attained and shutting off communication upon decrease thereof to a lower level limit,
   (o) said automatic pressure responsive valve having a bypass fluid connection to said tractor and trailer relay valve means for direct delivery of air thereto,
   (p) a control valve in a portion of the piping between said tractor tank and said trailer relay valve means responsive to the pressure in said piping extending from said tractor tank to said tractor relay valve means for controlling the delivering of air to the trailer relay valve means and tank,
   (q) and a brake control valve connected between said piping extending from said compressor to said tractor relay valve means and to said tractor and trailer relay valve means for controlling said relay valve means,
   (r) said brake control valve including means responsive to pressure of air delivered from said tractor tank for opening said connection between said piping extending from said compressor to said tractor relay valve means and said tractor and trailer relay valve means and including a second valve means responsive to pressure of air delivered from said compressor at said upper control level limit for permitting the discharging of the controlling pressure from said relay valve means and responsive to the lower control pressure from said compressor for preventing said discharging.

4. An air brake system as defined in claim 3 and further including a manually operable valve for releasing the air pressure applied to said relay valve means by said brake control valve for controlling said brakes for restricted operation.

5. In an air brake system for automotive vehicles of the tractor trailer type, including
   (a) an air compressor,
   (b) an air reservoir tank for the tractor,
   (c) a governor for said compressor responsive to the pressure in said tractor tank for delivery of air at an upper control level limit pressure,
   (d) piping extending from said compressor to said tractor tank, (e) air operated brakes on the tractor,
(f) tractor relay valve means connected to said tractor brakes,
(g) an air reservoir tank for the trailer,
(h) air operated brakes on the trailer,
(i) trailer relay valve means connected to the trailer brakes,
(j) piping extending from said tractor tank to said tractor and trailer relay valve means, including
(k) a fluid connection to said relay valve means, and
(l) manually operable valve means for controlling the flow of air through the piping from said tank to said relay valve means for the ordinary operation thereof, the combination therewith of
(m) structure for applying a test pressure at a predetermined test pressure level on said relay valve means and said brakes and the piping extending thereto,
(n) said structure including means for automatically causing the air to pass directly from the compressor to the relay valve means and the brakes,
(o) said means including an automatic pressure responsive valve interposed in the piping between said compressor and said tractor tank,
(p) said pressure responsive valve having a portion for shutting off communication therethrough until said test pressure level is attained,
(q) said automatic pressure responsive valve having a bypass fluid connection to said tractor and trailer relay valve means for direct delivery of air thereto,
(r) and a brake control valve connected between said piping extending from said compressor to said tractor relay valve means and to said tractor and trailer relay valve means for controlling said relays,
(s) said brake control valve including means responsive to pressure of air delivered from said compressor for opening said connection between said piping extending from said compressor to said tractor relay valve means and said tractor and trailer relay valves and including a second valve means responsive to pressure of air delivered from said compressor at said upper control level limit for permitting the discharging of the controlling pressure from said relay valves for release of said brakes and responsive to the lower control pressure from said compressor for preventing said discharging.

6. An air brake system as defined in claim 5 and further including a manually operable valve for releasing the air pressure applied to said relay valve means by said brake control valve for controlling said brakes for restricted operation References Cited in the file of this patent
UNITED STATES PATENTS
2,930,658    George _____ Mar. 29, 1960